June 22, 1965  C. F. RODGERS ETAL  3,190,241
SERVING TRAY FOR VEHICLES
Filed Nov. 15, 1963  2 Sheets-Sheet 1
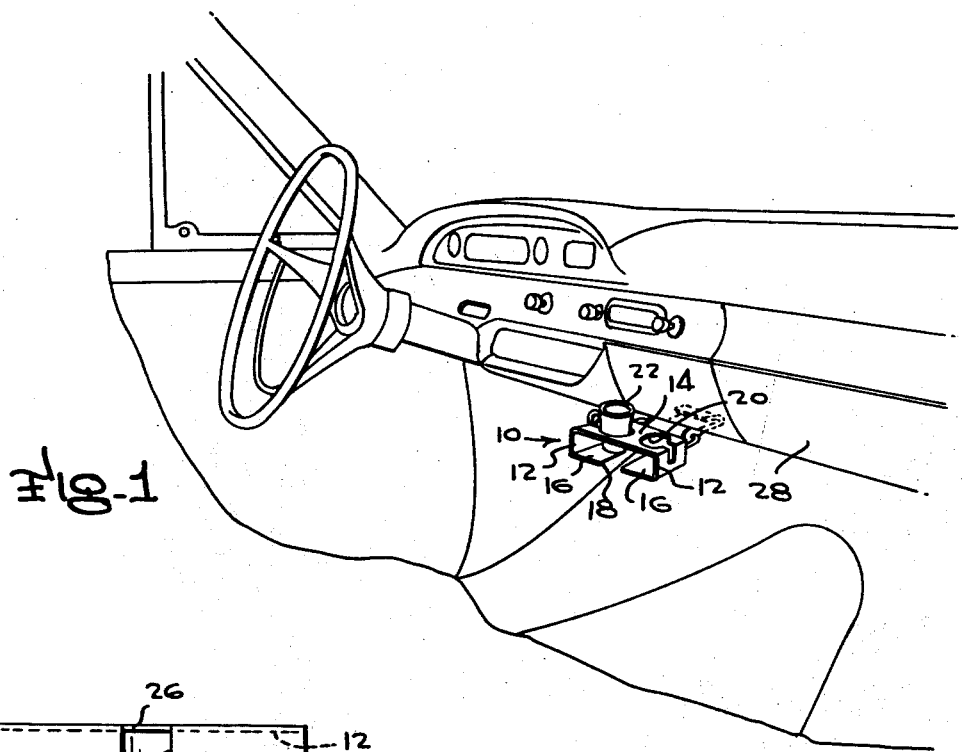
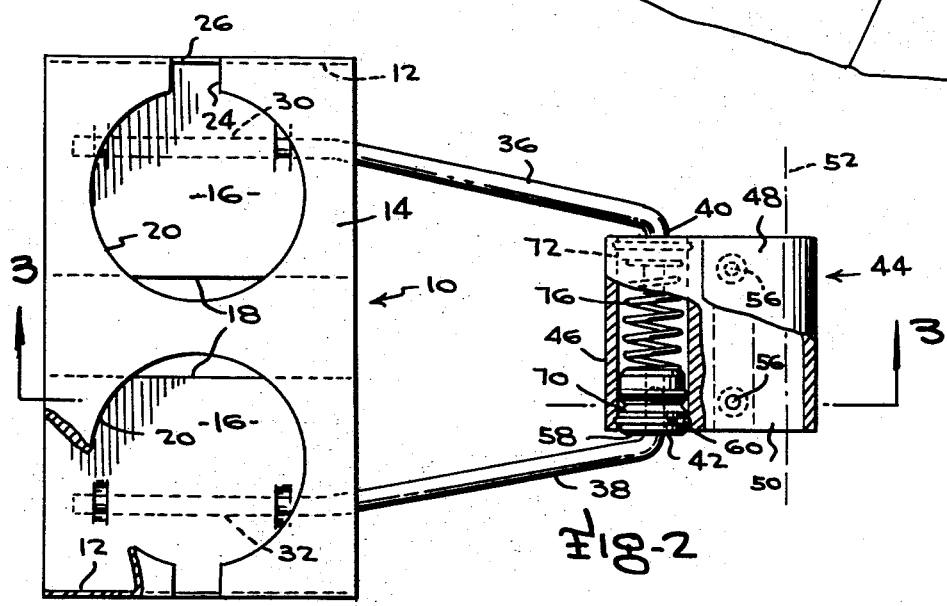
INVENTORS
CHARLES F. RODGERS, &
RUSSELL M. DEETER
BY
McMorrow, Berman & Davidson
ATTORNEYS

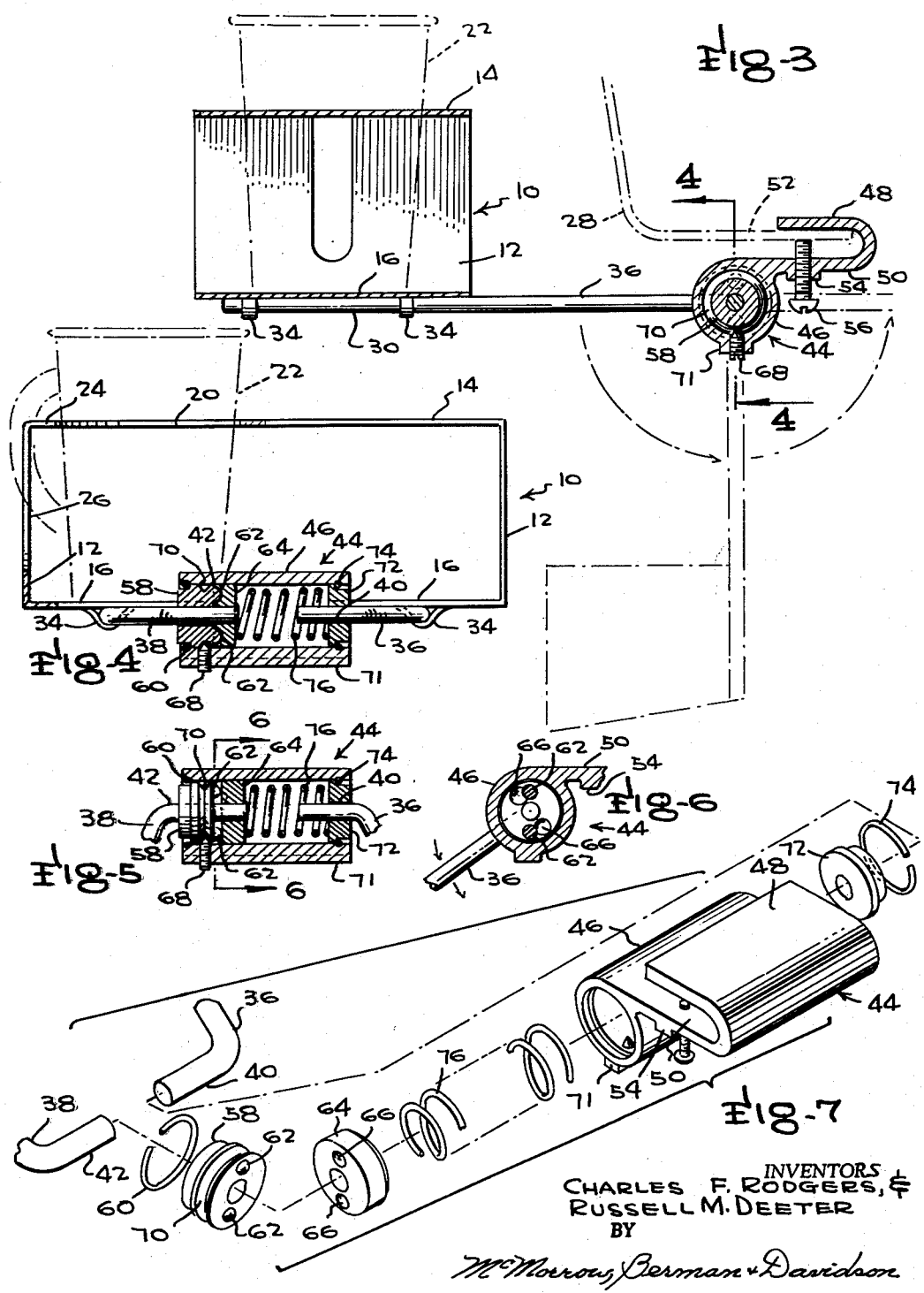

_3,190,241_
SERVING TRAY FOR VEHICLES
Charles F. Rodgers and Russell M. Deeter, both of
5334 Normandy Blvd., Jacksonville, Fla.
Filed Nov. 15, 1963, Ser. No. 324,034
2 Claims. (Cl. 108—45)

This invention relates to a serving tray adapted to be attached to motor vehicle instrument panels.

An object of the invention is to provide a serving tray adapted for permanent or temporary mounting on a vehicle instrument panel, the tray being readily swung up to use position or swung down to storage position, beneath the instrument panel, the tray having spring-biased self-locking detent means for locking the same in either position.

The objects also include the provision of a device which is simple of structure, easy of manufacture, installation and maintenance, sturdy in service, and low in cost.

These and other objects, which will be apparent, are attained by the present invention, a preferred form of which is described in the following specification, as illustrated in the drawing, in which:

FIGURE 1 is a perspective view of a portion of the interior of a vehicle showing a tray of the invention installed on an instrument panel in its position of use, FIGURE 2 is a top plan view of the tray, parts being broken away and in section, FIGURE 3 is a sectional view, taken on the plane of the line 3—3 of FIG. 2, showing the tray in use position, in full lines, and in two different storage positions, in phantom lines, FIGURE 4 is a sectional view, taken on the plane of the line 4—4 of FIG. 3, FIGURE 5 is a fragmentary section, like FIGURE 4, showing the detent mechanism in a rotated position of adjustment, FIGURE 6 is a sectional view taken on the plane of the line 6—6 of FIG. 5, and, FIGURE 7 is an exploded perspective view, showing the parts of the mounting assembly.

Referring to the drawings by characters of reference there is shown a rectangular, box-like tray element 10, open at its front and rear sides, and having a top wall 14, end walls 12, and two co-planar, bottom flanges 16, whose inner edges 18 may be spaced apart, as seen in FIG. 2. The top wall 14 has a pair of circular openings 20, to receive a cup 22, glass, bottle, can, or other receptacle, and preferably the top wall and the end walls have registering slots 24, 26, opening to the openings 20, the slots serving to accommodate cup handles (FIG. 4). It will be understood that the top, or either half thereof may also be used to hold sandwiches, or food or confection, or other comestibles, in bags, and that one side of the top may be left without an opening.

The tray element 10 is supported on a pair of arms 30, 32 secured to the related bottom flanges 16, as by being engaged through saddles 34, struck up from the flanges 16. The arms 30, 32 have convergent portions 36, 38 which terminate, at their forward ends in inwardly bent portions 40, 42, which serve as trunnions. The trunions are coaxially received in a mounting assembly 44.

The mounting assembly 44 comprises a tube fixed to a hook flange 48, having a shank 50 generally tangential to the top of tube 46. The hook flange 48, which is adapted to engage over the forwardly directed, bottom flange 52 of an instrument panel 28 (FIG. 3), may be provided with a rib 54, bored and threaded to receive clamping screws 56, which engage the underside of the flange 52 and hold the mounting assembly semi-permanently in place.

In the ends of the tube 46, cylindrical plugs are engaged, through which the trunnions 40, 42 are journaled. The plug 58 has an annularly rabbeted, outer periphery, receiving a split, locking ring 60, which is also received in an annular groove in the side wall of tube 46. The plug 58 is formed with a pair of hemispherical knobs 62 on its flat, inner face, located on a diameter, on opposite sides of the sleeve axis. The trunnion 42 has fixed, on its inner end, a cylindrical disc 64 having hemispherical recesses 66, adapted to receive the knobs 62 in two positions of rotation about the swing axis, 180° apart. These positions are defined by locking the plug 58 in adjusted position of rotation, which is accomplished by means of a set screw 68 threaded through the side wall of the tube 46, and having a pointed end engaging in an annular V groove 70 in plug 58. The tube 46 may also have a lower rib 71, through which screw 68 passes. At its other end, the tube 46 has engaged therein a plug 72, having a shouldered portion, by which it is held within the sleeve by a split, spring ring 74. Plug 72 and disc 64 are urged apart, to the limits determined by the retaining rings, by means of a coil, compression spring 76, within tube 46. This provides the resilient latching power, wherein cavities 66 of disc 64 are urged into mating relationship with knobs on plug 58. As seen in FIG. 3, these knobs and cavities are in mating relationship when the tray 10 is swung rearwardly and upwardly, to a horizontal, use position. Ordinarily, the resistance of the interlocking parts, as aided by the spring pressure, will be sufficient to hold the tray in position under reasonable loads, but positive lock means, such as a hand-operated set screw may also be provided, in the use position.

In order to stow the tray out of the way, it is only necessary to bear down on it, with sufficient pressure to cause the knobs 62 to cam the disc 64 inwardly against the resistance of the spring 76, and cause the tray to swing downwardly, an initial stage of such movement being shown in FIG. 6. This movement continues to, and through, the perpendicular pendant position shown in FIG. 3, to a forwardly extending position, also indicated, in part, in FIG. 3, wherein the knobs 62 again engage in the recesses 66, so that the tray is locked in storage position.

While a certain, preferred embodiment has been shown and described, various modifications will be apparent, in the light of this disclosure, and the invention should not therefore, be deemed as limited, except insofar as shall appear from the spirit and scope of the appended claims.

We claim:

1. A device of the character described comprising a tray element having bottom flanges, said flanges being formed with laterally spaced longitudinal saddles struck down out of said flanges, arms having rear end portions extending securably through the saddles, said arms having portions extending forwardly from the tray element and terminating in coaxial inwardly extending trunnions, and instrument panel carried mounting assembly in which said trunnions are engaged.

2. A device according to claim 1, wherein said tray element consists of a top wall, pendant end walls, said bottom flanges extending inwardly from the end walls, said top wall being formed with container receiving openings registered with the bottom flanges.

References Cited by the Examiner

UNITED STATES PATENTS

| | | | |
|---|---|---|---|
| 2,270,948 | 1/42 | Howe | 108—45 |
| 2,454,889 | 11/48 | Shelton et al. | 108—45 |
| 2,475,202 | 7/49 | Sammons | 108—45 |
| 2,574,250 | 11/51 | Dalton | 211—75 X |
| 2,772,934 | 12/56 | Eraht | 108—161 X |
| 2,795,299 | 6/57 | Batori | 108—6 X |
| 2,904,299 | 9/59 | Dalton | 248—293 |

FRANK B. SHERRY, *Primary Examiner.*